(12) United States Patent
Huang

(10) Patent No.: US 10,084,299 B1
(45) Date of Patent: Sep. 25, 2018

(54) SOCKET COVER

(71) Applicant: Chien-Jung Huang, Taipei (TW)

(72) Inventor: Chien-Jung Huang, Taipei (TW)

(*) Notice: Subject to any disclaimer, the term of this patent is extended or adjusted under 35 U.S.C. 154(b) by 0 days.

(21) Appl. No.: 15/599,483

(22) Filed: May 19, 2017

(51) Int. Cl.
*H02G 3/14* (2006.01)
*H05K 5/02* (2006.01)

(52) U.S. Cl.
CPC ............ *H02G 3/14* (2013.01); *H05K 5/02* (2013.01); *H05K 5/0239* (2013.01); *H05K 5/0243* (2013.01)

(58) Field of Classification Search
CPC ...... H05K 5/02; H05K 5/0239; H05K 5/0243; H02G 3/14
USPC .......................................................... 174/67
See application file for complete search history.

(56) References Cited

U.S. PATENT DOCUMENTS

| 4,810,833 | A | * | 3/1989 | Meyers | ............... | H02G 3/14 |
| | | | | | | 174/67 |
| 5,932,845 | A | * | 8/1999 | Lacy | ............ | H02G 3/14 |
| | | | | | | 174/67 |

* cited by examiner

*Primary Examiner* — Dhirubhai R Patel

(57) ABSTRACT

A socket cover for covering a seat of a socket includes a body covering on the seat; the body having two recesses and two openings; the openings are positioned corresponding to the two electrical connecting portions so as to expose the two electrical connecting portions; two protecting sheets on the body; the each protecting sheet being movable along a first moving path and between an open position and a close position; a direction of the first moving path being parallel to axes of the two protecting sheets; and wherein when the protecting sheet is positioned in the recess, it is at the open position; and when the protecting sheet moves to the close position, it will cover a respective one of the two electrical connecting portions. The recesses and the protecting sheets are arranged on an outer side of the body or an inner side of the body.

11 Claims, 17 Drawing Sheets

SOCKET COVER

FIELD OF THE INVENTION

The present invention relates to socket cover, and in particular to a socket cover with safety protection function.

BACKGROUND OF THE INVENTION

Power sockets generally have a plurality of insertion slots for being inserted by a plurality of plugs. It is a convenient device. However, the slots exposing out cause that dust, and other undesired dregs accumulate thereon so as to affect appearances, qualities and lifetime of the sockets. Furthermore, in unused state, if no any protection to the socket, it is possible that some accidents occur due to error contact and short circuits.

SUMMARY OF THE INVENTION

To achieve above object, the present invention provides a socket cover covering a seat of a socket, the socket has two electrical connecting portions, comprising: a body covering on the seat; the body having two recesses and two openings; the openings are positioned corresponding to the two electrical connecting portions so as to expose the two electrical connecting portions; two protecting sheets on the body; the each protecting sheet being movable along a first moving path and between an open position and a close position; a direction of the first moving path being parallel to axes of the two protecting sheets; and wherein when the protecting sheet is positioned in the recess, it is at the open position; and when the protecting sheet moves to the close position, it will cover a respective one of the two electrical connecting portions.

Furthermore, the recesses and the protecting sheets are arranged on an outer side of the body; or the recesses and the protecting sheets are arranged on an inner side of the body, when the protecting sheets are at an open position, the protecting sheets are installed between the body and the seat.

DETAILED DESCRIPTION OF THE INVENTION

Figure 1A:
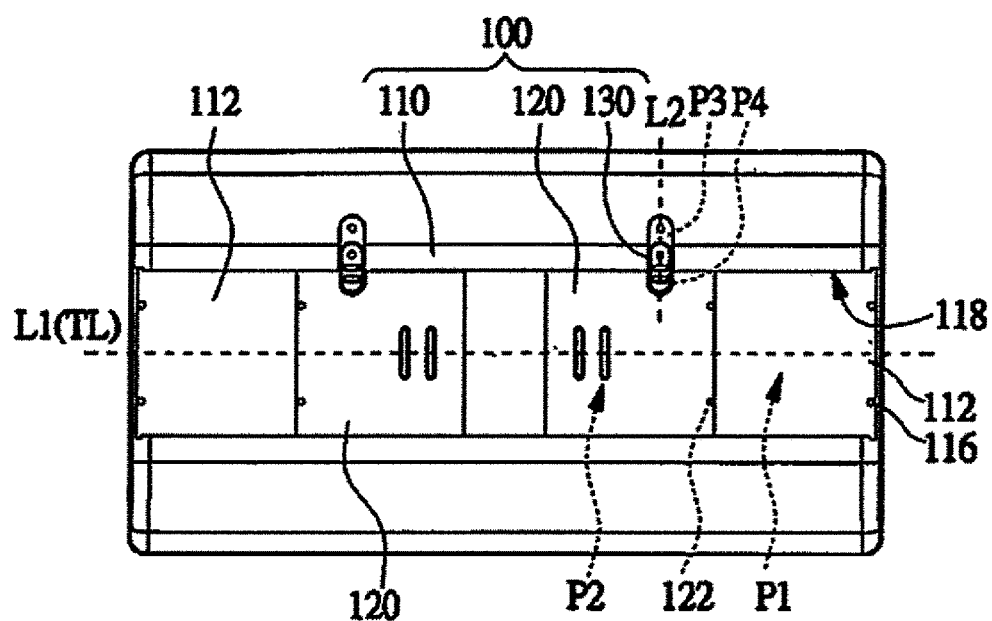
FIG. 1A is a schematic view showing the socket cover of the present invention in the embodiment.
Figure 1B:
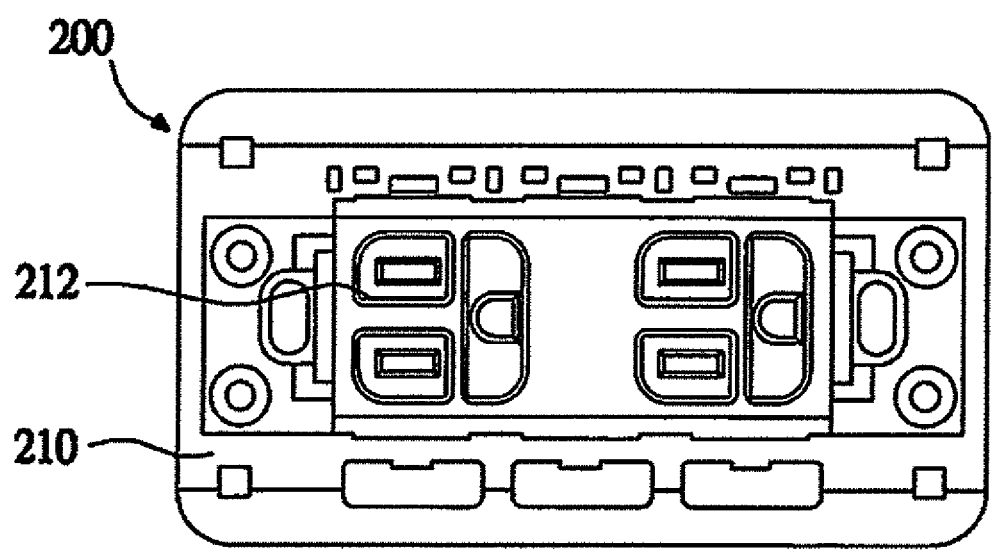
FIG. 1B shows the seat of FIG. 1A.

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

With reference to FIGS. 1A, 1B, 2 and 5, the socket cover 100 of the present invention is used to cover a seat 210 of a socket 200. The seat 210 has two electrical connecting portions 212. In this embodiment, the socket cover 100 includes a body 110, and two protecting sheets 120. The socket cover 100 serves to cover the seat 210. The body 110 has two recesses 112 and two openings 114. Each opening 114 exposes on a respective one of the electrical connecting portion 212 of the seat 210

Figure 2:
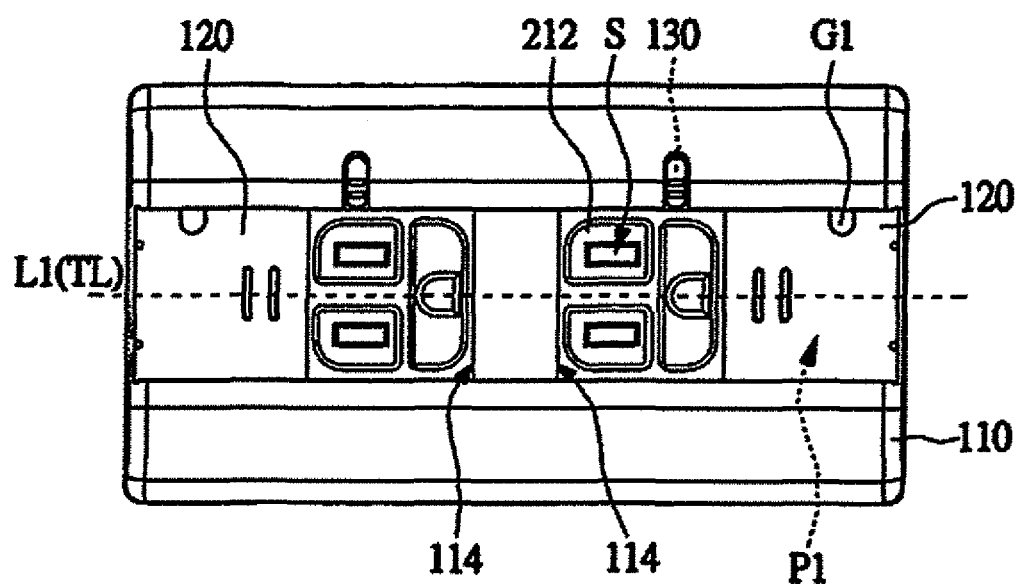
FIG. 2 is a schematic view showing that the socket cover of FIG. 1A covers on the seat.

The two protecting sheets 120 is, for example, arranged on a right and a left side of the body 110. Each protecting sheet 120 is arranged on a respective of the openings 114 and covers a respective one of the electrical connecting portions 212. In FIG. 2, each protecting sheet 120 movable from the respective opening 114 to the respective recess 112 so not to cover the electrical connecting portion 212. That is, in FIG. 2, the electrical connecting portion 212 exposed from the opening 114 is not covered by the protecting sheet 120. In FIG. 2, the two protecting sheets 120 moved along opposite direction to open the electrical connecting portion 212, but this is not used to confine the scope of the present invention, the two protecting sheets 120 may be moved along the same direction for exposing the electrical connecting portions 212.

Figure 3A:
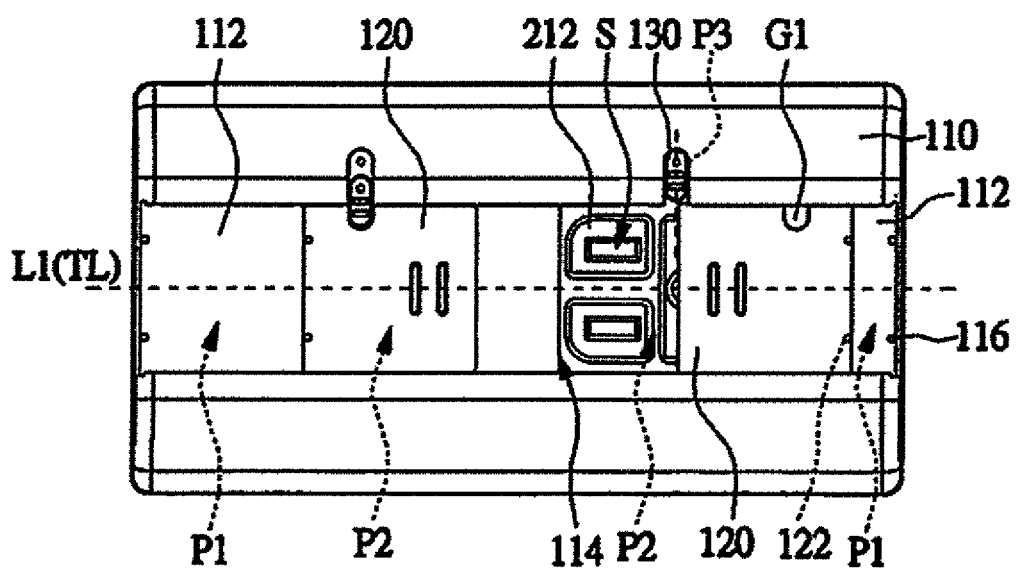
FIG. 3A to 3B the operation of the protecting sheet in the FIG. 2.
Figure 3B:
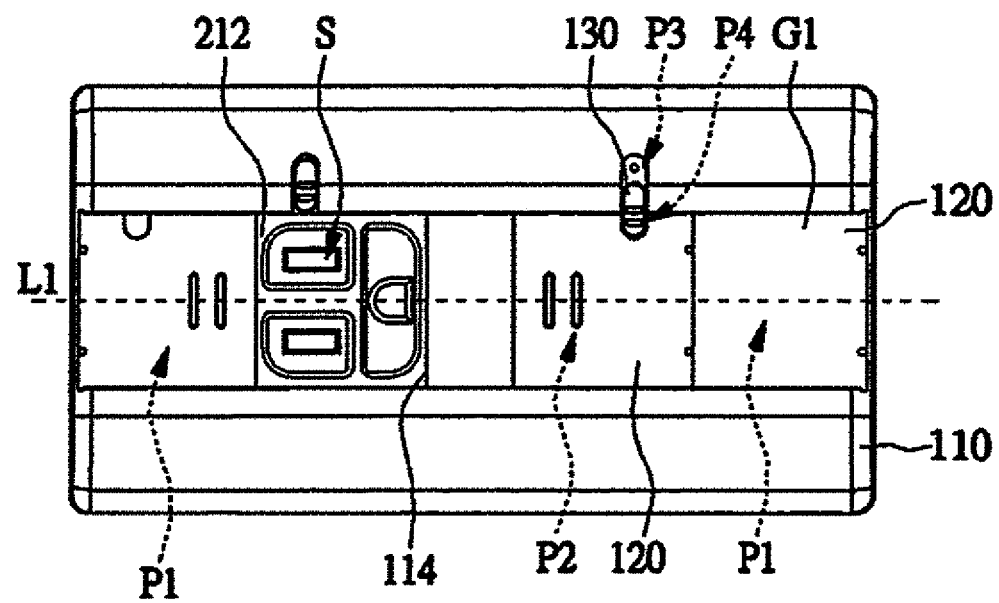

In FIGS. 3A and 3B, at this embodiment, the two protecting sheets 120 are slidably installed on the body 110. Each protecting sheet 120 moves along a first moving path L1 between an open position P1 and a close position P2. In FIG. 3A, the left protecting sheet 120 is at the close position P2, then it moves to cover the electrical connecting portion 212 at an open position P1 so as to open the electrical connecting portion 212. FIG. 3B shows a similar opening for the protecting sheet 120 to move along a reverse operation.

Figure 5:
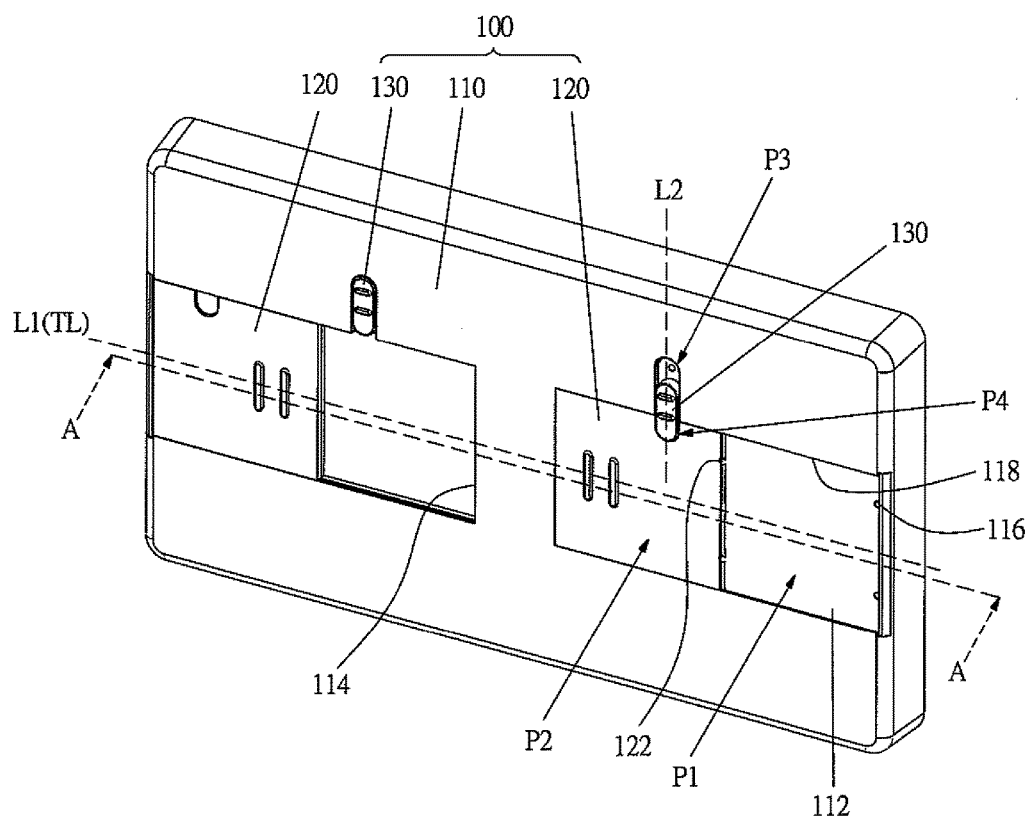
FIG. 5 is a perspective view about the socket cover of the first embodiment of the present invention.

Referring to FIG. 5, the body 110 has a guide portion 118. Thereby, the protecting sheet 120 moves along a first moving path L1 by the guiding of the guide portion 118 so as to moves between the open position P1 and the close position P2.

Figure 6A:
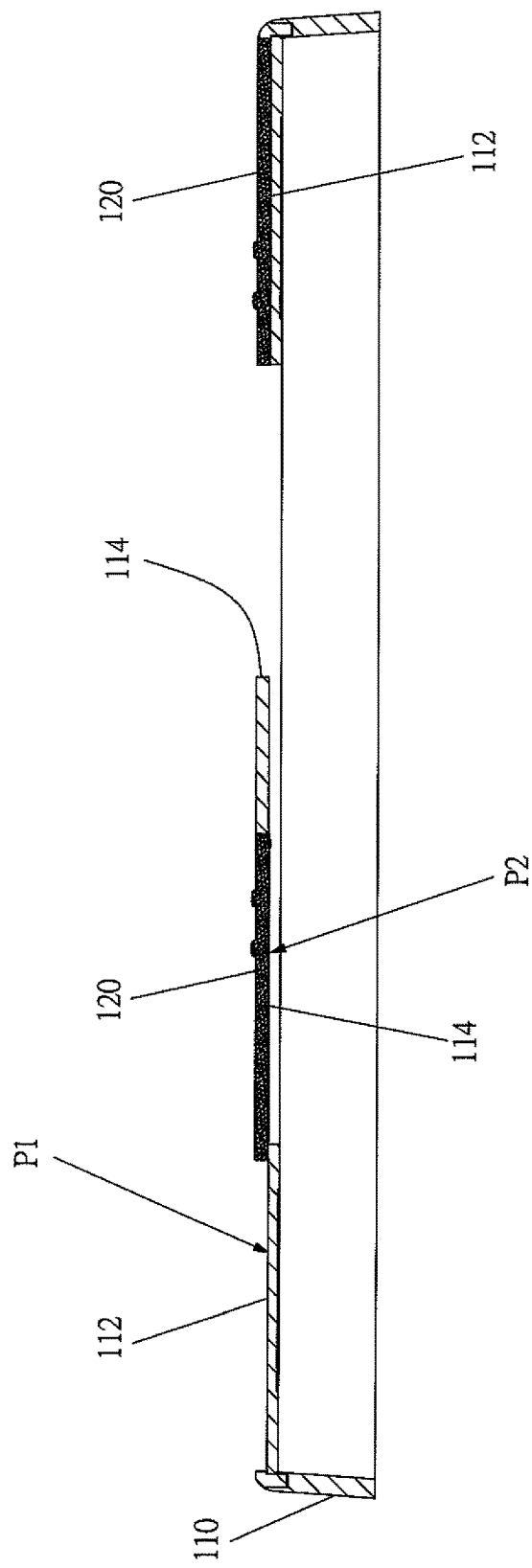
FIG. 6A is a cross sectional view along A-A of FIG. 5.
Figure 6B:
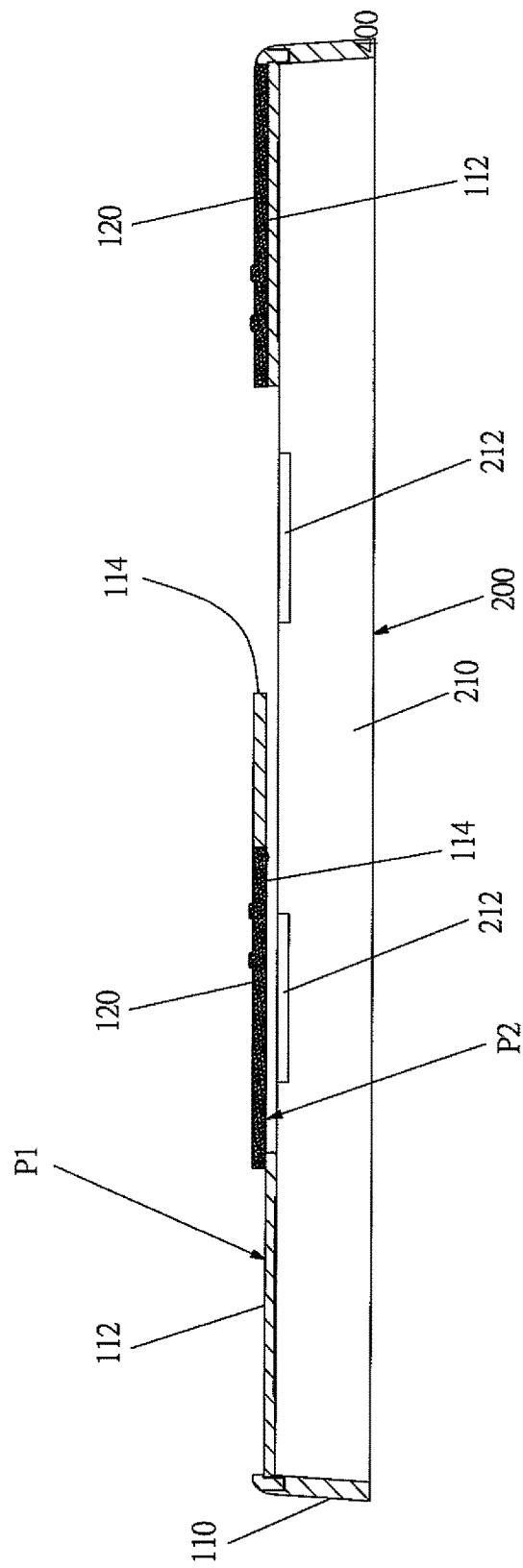
FIG. 6B is a cross sectional view showing that the socket cover of FIG. 6A covers on the seat.

With reference to FIGS. 6A and 6B, it shows that when one protecting sheet 120 is at the open position P1, another protecting sheet 120 is at the recess 112 of the body 110. The protecting sheet 120 at the open position P1 moves to the close position P2, it is at an upper side of the electrical connecting portion 212 so as to cover it. Thus the protecting sheet 120 provides the function of water and dust proof to the electrical connecting portion 212.

Figure 4:
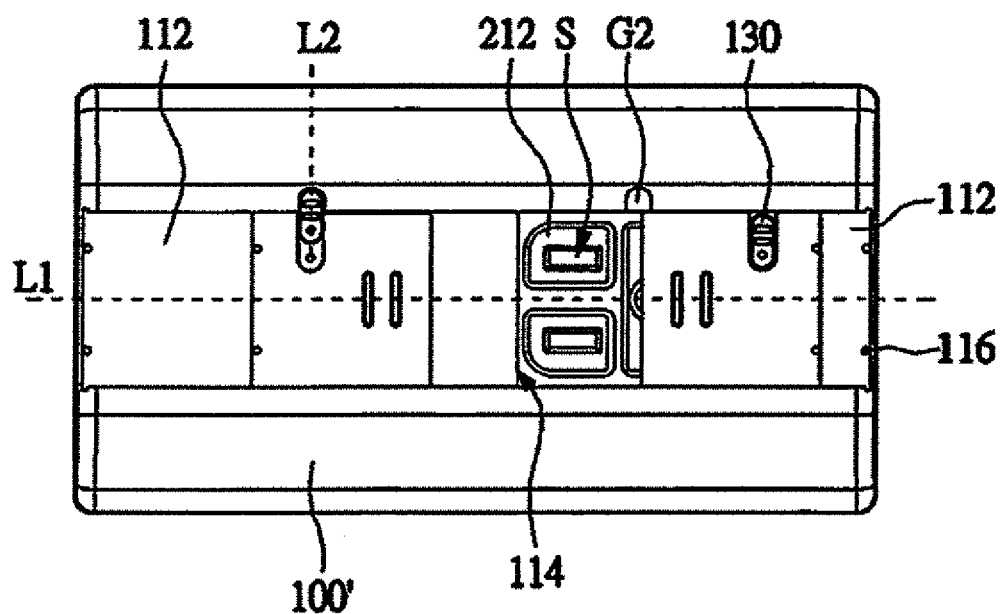
FIG. 4 is a schematic view of the second embodiment of the present invention, in that the socket cover covers on the seat of FIG. 1B.

With reference to FIGS. 4 and 5, to cause the protecting sheet 120 to be firmly secured on the body 110, the distal end of the recess 112 is formed with a first positioning portion 116 and the side of the protecting sheet 120 is formed with a second positioning portion 122 which can be buckled to the first positioning portion 116. Therefore when the protecting sheet 120 is moved to the distal end of the recess 112, the first and second positioning portions 116 and 122 are buckled so as to be firmly secured to the protecting sheet 120 not to move to cover the electrical connecting portion 212.

With reference to FIGS. 4 and 5, the plug cover 100 of the present invention further comprises at least one limiter 130. The limiter 130 is slidable between a releasing position on a lateral side of the body 110 and a limiting position P4 on the protecting sheet 120. When the limiter 30 is slide into the limiting position P4, the protecting sheet 120 is firmly secured without movement so as to firmly cover the electrical connecting portion 212.

FIG. 3A shows that the protecting sheet 120 at the left side is limited by the limiter 130 so that the electrical connecting portion 212 at the left side is covered. FIG. 3B shows an opposite status for the two limiters 130.

FIG. 4 shows that in the present invention, the limiter 130 at the right side is embedded into the protecting sheet 120 at the right side, so that the electrical connecting portion 212 at the right side exposes out for be used, while the limiter 130 at the left side is arranged between the protecting sheet 120 at the left side and the body 110 so that the electrical connecting portion 212 at the left side is covered.

In above embodiment, the recesses 112 and the protecting sheets 120 exposes out from an outer side of the body 110.

FIGS. 7 to 10 shows another embodiment of the present invention, herein the elements with numerals identical to the above said embodiment has the same functions as those described in above said the present invention. Thus, the details of these elements are not described herein.

Figure 8A:
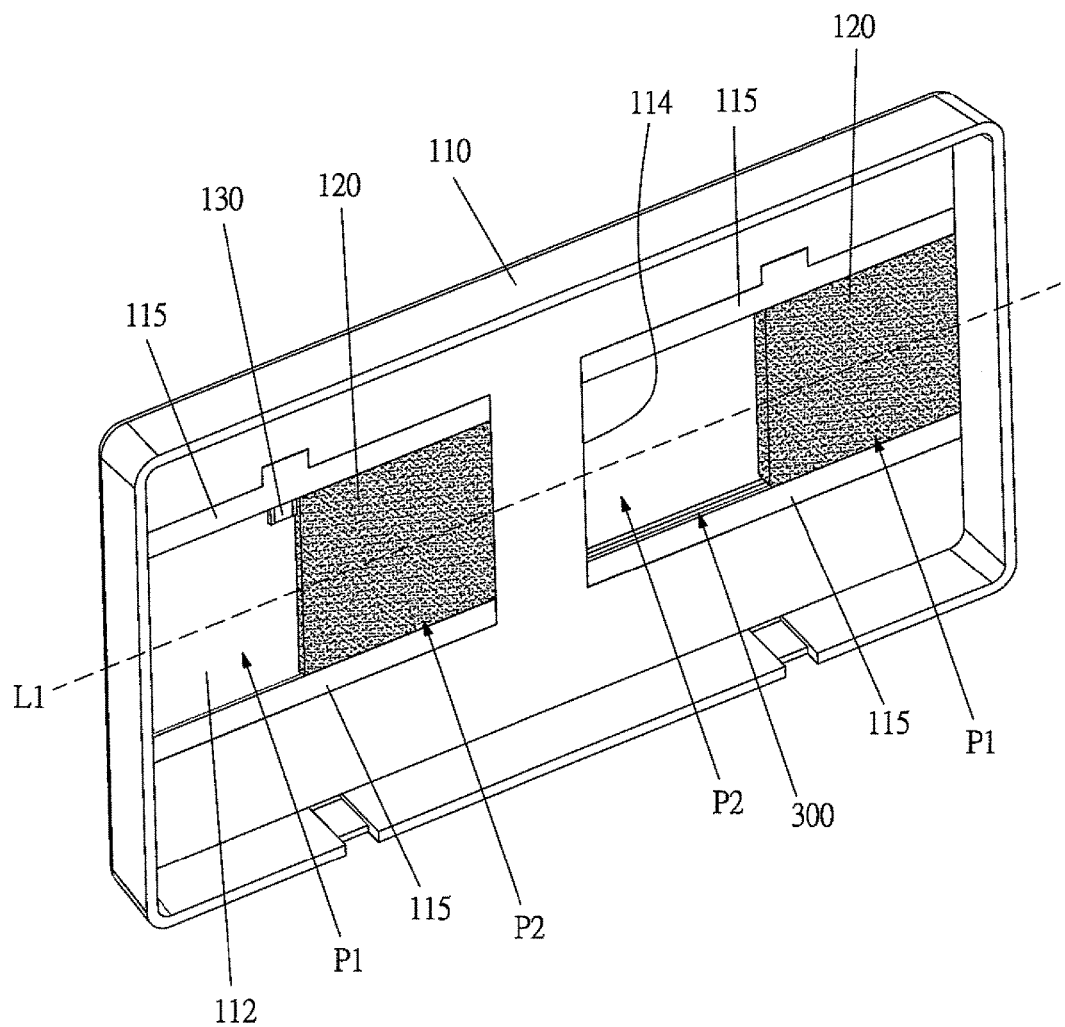
FIG. 8A shows an inner side of FIG. 7.
Figure 8B:
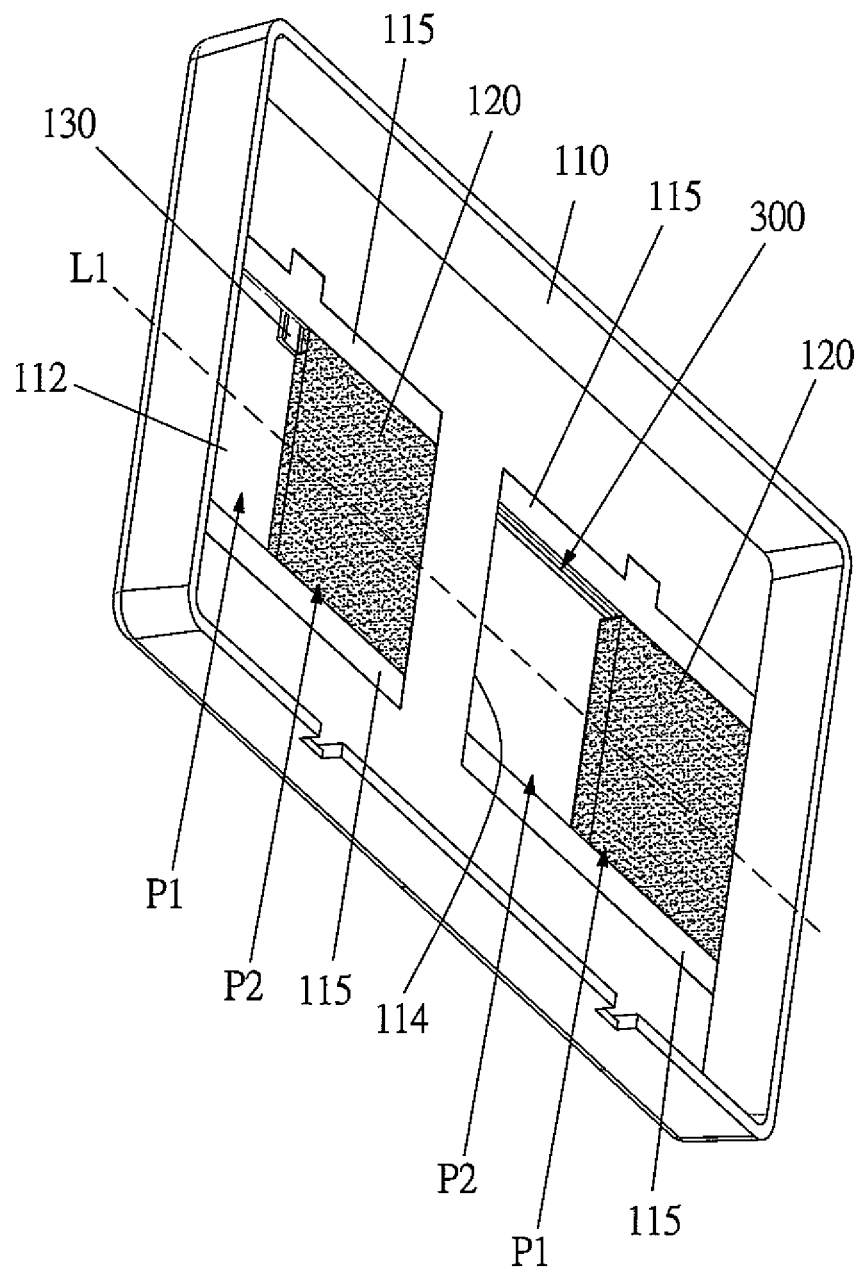
FIG. 8B is an elevation view of the socket cover in the FIG. 8A.
Figure 10A:
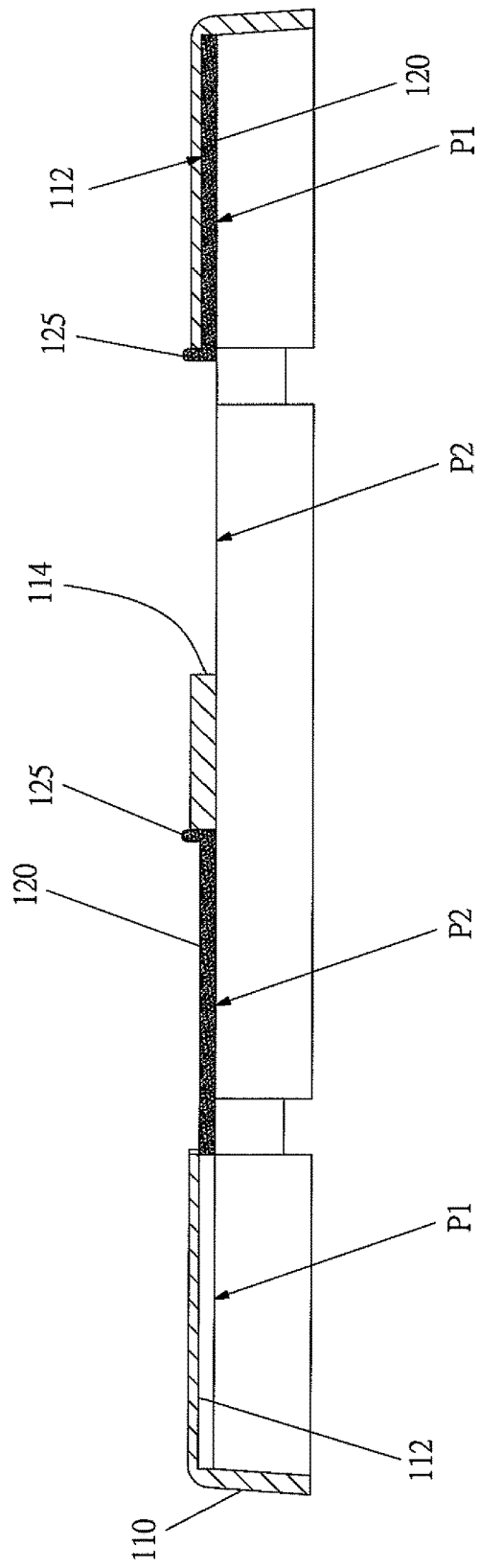
FIG. 10A is a cross sectional view along line B-B of FIG. 7.
Figure 10B:
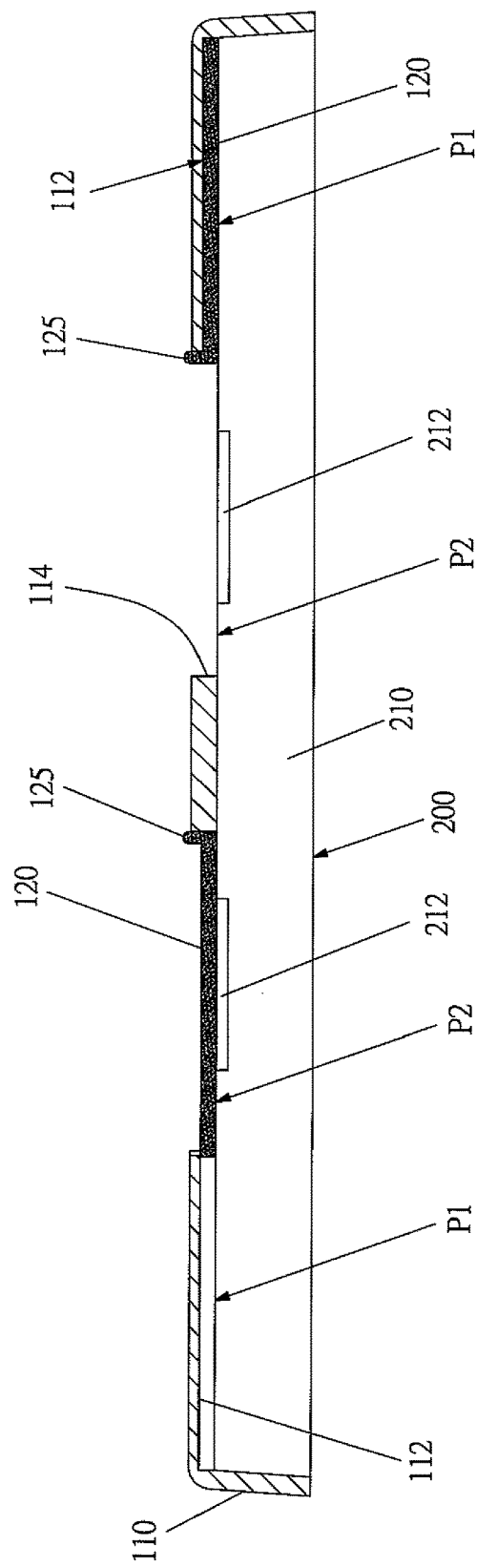
FIG. 10B is a cross sectional view showing that the socket cover of 10A covers on the seat.

In FIGS. 8A, 10A and 10B, it is illustrated that the recesses 112 and protecting sheets 120 are arranged at an inner side of the body 110. Referring to FIGS. 10A and 10B, when the protecting sheets 120 are at an open position P1, the protecting sheets 120 are arranged between the body 110 and the seat 210. Another, when the protecting sheets 120 are moved to a close position P2, the protecting sheets 120 are moved to cover the electrical connecting portions 212, respectively. Thus the socket cover 210 with the protecting sheets 120 of the present invention can seal the seat 210 so that the socket 200 is water and dust proof.

the inner side of the body 110 are arranged with guiding tracks 115 at two sides of each protecting sheet 120. Each guiding track 115 is formed with tracks therein so that each protecting sheet 120 is slidable along the tracks to open or close the electrical connecting portion 212.

As illustrated in FIGS. 10A and 10B, it is illustrated that one end side of the protecting sheet 120 near a center of the socket is formed with a protrusion 125 which exposes out to an outer side of the body 110. When the protecting sheet 120 is at an open position P1, the protrusion 125 will resist against an edge wall of the recess 112 at the opening portion 114 so as to expose the electrical connecting portion 212.

Figure 8C:
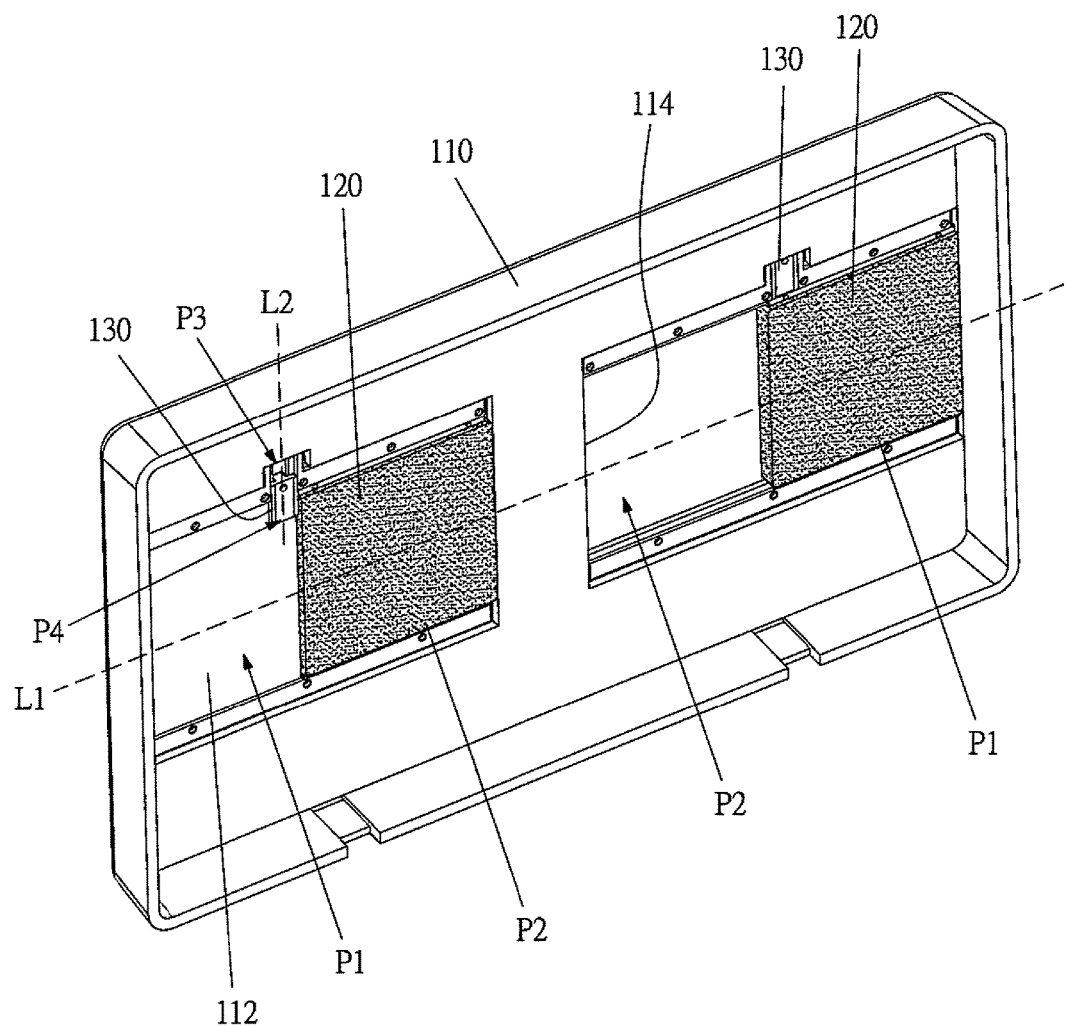
FIG. 8C is a perspective view of the socket cover in FIG. 8A, in that the guide portion is not shown.
Figure 9A:
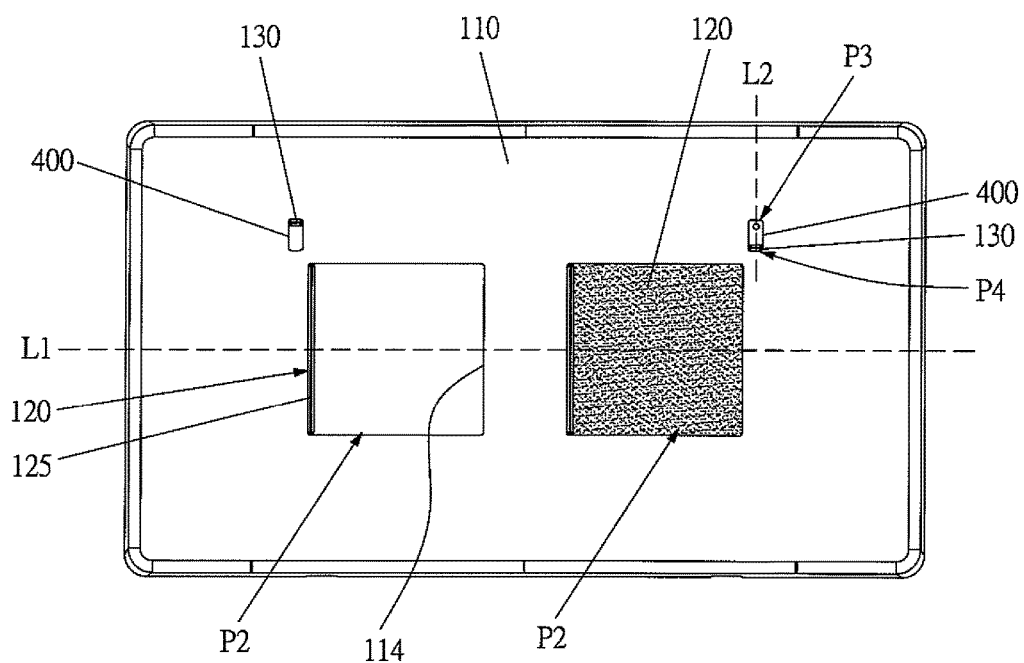
FIG. 9A is a plane schematic view showing the outer side of FIG. 7.
Figure 9B:
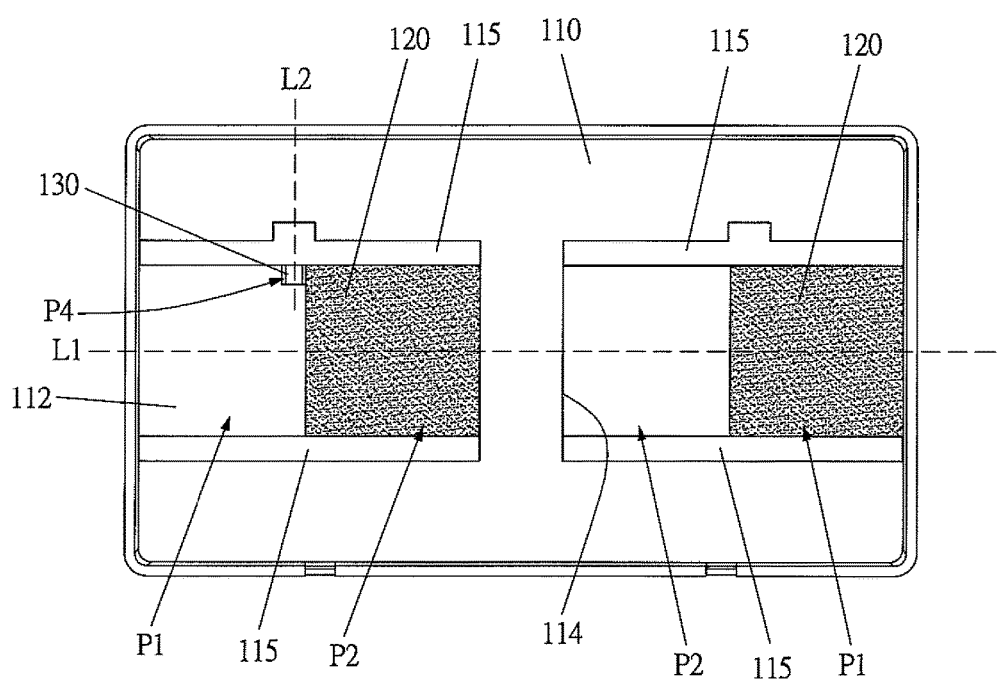
FIG. 9B is a schematic view showing the inner side of the FIG. 7.

With reference to FIGS. 8C and 9B, it is illustrated that the limiter 130 is slidable in the body 110. In this embodiment, when the protecting sheet 120 moves to a close position P2, the limiter 130 moves along a second moving path L2 from a release position P3 to a limiting position P4 on the first moving path L1 so as to cover one side of the protecting sheet 120 so that the protecting sheet 120 is fixed to the close position P2.

Figure 7:
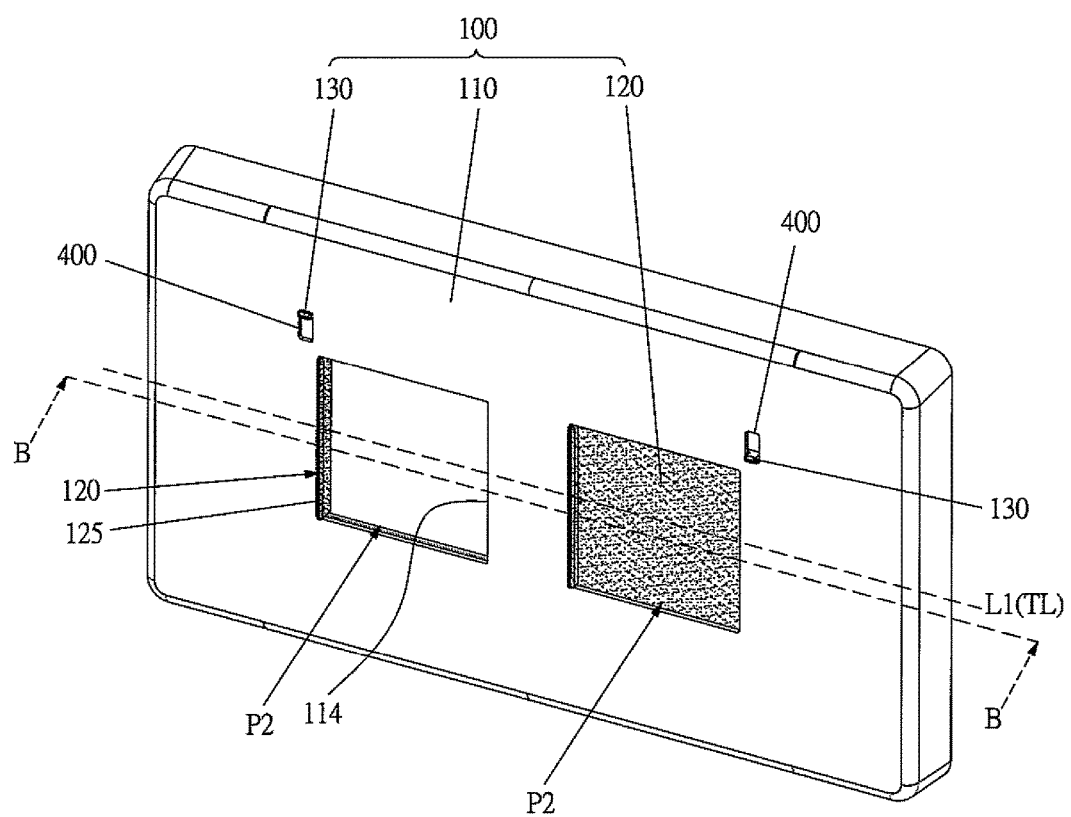
FIG. 7 shows the socket cover in third embodiment of the present invention.

As illustrated in FIGS. 7, 8C and 9A, the body 110 is formed with at least one through hole 110 and respective guiding element 115. One end of the limiter 130 is inserted into a respective through hole 400 and another end thereof exposes out of the through hole. The limiter 120 is protruded from the body so that the user can drive the limiter to move.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A socket cover for covering a seat of a socket, the socket having electrical connecting portions, comprising:
   a body (110) covering on the seat (210); the body having two recesses (112) and two openings (114); the openings are positioned corresponding to two electrical connecting portions so as to expose the two electrical connecting portions;
   two protecting sheets (120) on the body; each of said protecting sheet being movable along a first moving path and between an open position and a close position; a direction of the first moving path being parallel to axes of the two protecting sheets; and
   wherein when a protecting sheet is positioned in a respective one of the two recesses, it is at the open position; and when the protecting sheet moves to the close position, it will cover a respective one of the two electrical connecting portions; and
   a first limiter (130); the limiter (130) being slidable between a releasing position on a lateral side of the body (110) and a limiting position in the protecting sheet (120); when the first limiter (130) slides into the limiting position, the protecting sheet is firmly secured without movement;
   wherein the distal end of the recess (112) is formed with a first positioning portion (116) and a side of the protecting sheet is formed with a second positioning portion (122) which can be buckled to the first positioning portion (116); when the protecting sheet (120) is moved to the distal end of the recess (112), the first and second positioning portions are buckled so as to be firmly secured to the protecting sheet (120) not to move and thus to cover the electrical connecting portion (212);
   wherein the recesses (112) and the protecting sheets (120) are arranged on an inner side of the body (110), when the protecting sheets (120) are at an open position, the protecting sheets (120) are installed between the body (110) and the seat (210); and
   wherein the inner side of the body (110) are arranged with guiding tracks (115) at two sides of each protecting sheet (120); each guiding track (115) is formed with tracks therein so that each protecting sheet (120) is slidable along the tracks to open or close the electrical connecting portion (212).

2. The socket cover as claimed in claim 1, wherein the body has a groove for receiving the first limiter and the protecting sheet has a groove for receiving the first limiter.

3. The socket cover as claimed in claim 1, wherein the first and second positioning portions are buckled together.

4. The socket cover as claimed in claim 1, wherein the body has a guide portion, and the protecting sheet moves along a first moving path by guiding of the guide portion so as to moves between the open position and the close position.

5. The socket cover as claimed in claim 1, wherein the recesses and the protecting sheets are arranged on an outer side of the body.

6. The socket cover as claimed in claim 1, wherein one end side of the protecting sheet near a center of the socket is formed with a protrusion which exposes out to an outer side of the body; when the protecting sheet is at an open position, the protrusion will resist against an edge wall of the recess at the opening portion so as to expose the electrical connecting portion.

7. The socket cover as claimed in claim 1, further comprising a second limiter; the second limiter being slidable between a releasing position on a lateral side of the body and a limiting position in the protecting sheet; when the second limiter is slide into the limiting position, the protecting sheet is firmly secured without movement.

8. The socket cover as claimed in claim 7, wherein the second limiter moves along a second moving path, and the first moving path is vertical to the second moving path.

9. The socket cover as claimed in claim 1, wherein the body is formed with at least one through hole; one end of the second limiter is insertable into the through hole and another end thereof exposes out of the through hole and protruded from the body so that the user can drive the second limiter to move.

10. The socket cover as claimed in claim 1, wherein when each of the protecting sheet moves to a close position, the body and the two protecting sheets seal the seat.

11. The socket cover as claimed in claim 1, wherein the first limiter moves along a second moving path, and the first moving path is vertical to the second moving path.

* * * * *